United States Patent
Marjelund et al.

(10) Patent No.: US 8,266,240 B2
(45) Date of Patent: Sep. 11, 2012

(54) DYNAMIC ALLOCATION OF A RADIO RESOURCE

(75) Inventors: Pekka Marjelund, Muijala (FI); Matti Jokimies, Salo (FI)

(73) Assignee: Nokia Corporation, Espoo (FI)

( * ) Notice: Subject to any disclaimer, the term of this patent is extended or adjusted under 35 U.S.C. 154(b) by 1803 days.

(21) Appl. No.: 10/482,474

(22) PCT Filed: May 8, 2002

(86) PCT No.: PCT/IB02/01576
§ 371 (c)(1),
(2), (4) Date: Dec. 31, 2003

(87) PCT Pub. No.: WO03/096647
PCT Pub. Date: Nov. 20, 2003

(65) Prior Publication Data
US 2004/0185860 A1    Sep. 23, 2004

(51) Int. Cl.
*G06F 15/16* (2006.01)
(52) U.S. Cl. .......... 709/217; 455/450
(58) Field of Classification Search .......... 709/226, 709/230, 235, 247, 217; 715/704, 716, 717; 704/208; 455/450
See application file for complete search history.

(56) References Cited

U.S. PATENT DOCUMENTS

| | | | |
|---|---|---|---|
| 5,327,576 A | 7/1994 | Uddenfeldt et al. | |
| 5,923,650 A | 7/1999 | Chen et al. | |
| 6,031,827 A * | 2/2000 | Rikkinen et al. | 370/330 |
| 6,219,343 B1 * | 4/2001 | Honkasalo et al. | 370/335 |
| 6,347,226 B1 * | 2/2002 | Virtanen | 455/450 |
| 6,356,759 B1 * | 3/2002 | Mustajarvi | 455/450 |
| 6,374,112 B1 * | 4/2002 | Widegren et al. | 455/452.2 |
| 6,519,462 B1 * | 2/2003 | Lu et al. | 455/453 |
| 6,680,921 B1 * | 1/2004 | Svanbro et al. | 370/324 |
| 7,181,224 B2 * | 2/2007 | Quirke et al. | 455/452.1 |
| 7,457,239 B2 * | 11/2008 | Matsubara et al. | 370/230 |
| 7,460,475 B2 * | 12/2008 | Tourunen et al. | 370/230.1 |
| 7,467,220 B2 * | 12/2008 | del Val et al. | 709/231 |
| 2002/0097723 A1 * | 7/2002 | Tourunen et al. | 370/392 |

FOREIGN PATENT DOCUMENTS

| | | |
|---|---|---|
| WO | WO 99/66736 | 12/1999 |
| WO | WO 02/33931 | 4/2002 |

OTHER PUBLICATIONS

3rd Generation Partnership Project; Technical Specification Group Radio Access Network; Radio Access Bearer Support Enhancement, V2.0.0 Mar. 2001.*

* cited by examiner

*Primary Examiner* — Emmanuel L Moise
*Assistant Examiner* — Marie Georges Henry
(74) *Attorney, Agent, or Firm* — Squire Sanders (US) LLP

(57) ABSTRACT

The present invention relates to a method and network device for allocating a radio resource, e.g. a radio bearer, to a data connection. First, a radio resource is allocated-to the data connection and data transmitted via the data connection is compressed and transmitted using the allocated radio resource. During the transmission, a transmission parameter of the compressed data is monitored and the allocated radio resource is reconfigured based on the monitoring result. Thereby, the radio resource can be dynamically adapted to different data rates during the connection. Header compression benefits are available to all kinds of traffic without the disadvantage of having too low or too high data rates.

17 Claims, 2 Drawing Sheets

DYNAMIC ALLOCATION OF A RADIO RESOURCE

FIELD OF THE INVENTION

The present invention relates to a method and network device for allocating a radio resource, such as radio bearer, to a data connection between a network and a terminal.

BACKGROUND OF THE INVENTION

Third generation mobile systems, e.g. UMTS (Universal Mobile Telecommunications System), will provide not only circuit-switched services, but also packet-switched services similar to GPRS (General Packet Radio Service) designed for GSM (Global System for Mobile Communications). Packet-switched data transmission enables the use of different data services at a mobile terminal, while allocation of radio resources is required at the radio interface of the mobile system for each user, as necessary. When a user of a terminal in a UMTS system wants to use a packet-switched application, for instance to download a video or email from the network to the terminal device, a radio resource management system (RRM) of the UMTS system allocates an application-based capacity reservation to a radio bearer, which not only depends on the used application but also on the available radio bearer parameters. The radio bearer corresponds to the service provided by layer 2 of the transmission protocol for transfer of user data between the terminal device, e.g. mobile station (MS) or user equipment (UE), and the radio access network, e.g. UTRAN (UMTS Terrestrial Radio Access Network), GERAN (GSM/EDGE Radio Access Network) or IP RAN (IP based Radio Access Network). The radio interface corresponds to the interface between the terminal device and the access point of the RAN. This term encompasses all functionality required to maintain such interfaces.

In a typical one-way data transmission, for instance, when a file is downloaded from the network, a predetermined data rate can be allocated to a terminal in the downlink direction, i.e. from the base station to the terminal device. In such an application, in the uplink direction, i.e. from the terminal to the base station, data transmission bandwidth is typically low, consisting of, e.g., TCP (Transmission Control Protocol) layer acknowledgements.

One of the operations performed on the data transmitted over the radio bearer is the compression of the header fields of data packets. Header compression of transmitted data packets and decompression of received data packets is performed in a packet data conversions protocol (PDCP) layer of the UMTS system. The PDCP layer of the terminal device may support several header compression methods so as to enable connection set-up with as many layer protocol types as possible. Some header compression methods may also need a reverse connection for making different acknowledgements and solving error situations. More bandwidth then needs also to be reserved for the reverse connection, but, on the other hand, the compression of the header field decreases the need for a bandwidth in the forward direction of the connection.

Header compression of IP (Internet Protocol) flows is possible due to the fact that the fields in the headers of IP packets are either constant or changing in a known pattern between consecutive packets in the same flow. It is possible to send only information regarding the nature of the changing fields of the headers with respect to a reference packet in the same IP flow. The benefit is a significant reduction in header overhead and hence an increase in bandwidth efficiency. For example, IP based voice applications require an IP header of 20 octets for IPv4 and 40 octets for IPv6, UDP (User Datagram Protocol) header of 8 octets and RTP (Real time Transmission Protocol) header of 12 octets. When this is compared to the size of the payload which is of the order of 7 to 32 bytes, the gains from compressing the headers is quite apparent.

In order for header compression to work, there must be a compressor and a decompressor for each header compression context. During normal operation, the compressor will always try to send compressed headers instead of full headers. The compressed header represents the relative changes to the reference packet in the same header compression context and therefore the changes are relatively small. As IP based multimedia services are increasing rapidly, there is a need to support real-time IP services in the radio access network, e.g. UTRAN. However, with the added difficulties due to the radio interference there is a need for header compression to be robust in a cellular environment. Therefore, the IETF (Internet Engineering Task Force) has developed a Robust Header Compression (ROHC) scheme to standardize a header compression protocol suitable for wireless links. According to this ROHC scheme, the compressor starts in the lowest compressor state and gradually transitions to higher compression states. The general principle is that the compressor will always operate in the highest possible compression state, under the constraint that the compressor has sufficient confidence that the decompressor has the information necessary to decompress a compressed header. In the reliable mode, this confidence comes from the receipt of acknowledgements from the decompressor. Otherwise, this confidence comes from sending an information a certain number of times, utilizing a cyclic redundancy check (CRC) calculated over the uncompressed headers, and from not receiving negative acknowledgements. The compressor may also transition back to a lower compressions state when necessary. For IP/UDP/RTP, IP/UDP, ESP (Encapsulating Security Payload Header)/IP compression profiles, three compressor states have been defined, i.e. an Initialization/Refresh state (IR state), a First Order state (FO state), and a Second Order state (SO state). The purpose of the IR state is to set up or refresh the context between the compressor and the decompressor. The compressor enters this state at initialization, upon request from the decompressor or upon refresh time-out. The compressor leaves the IR state when it is confident that the decompressor has correctly received the refresh information. On the other hand, the compressor operates in the FO state when the header stream does not conform to a uniform pattern, i.e. constant changes, or when the compressor is not confident that the decompressor has acquired the parameters of the uniform pattern. The compressor will leave this state and transition to the SO state when the header conforms to a uniform pattern and when the compressor is sufficiently confident that previous non-uniform changes have reached the decompressor. Finally, in the SO state the compressor is sufficiently confident that the decompressor has also acquired the parameters of the uniform pattern. In the SO state the compressor sends headers, which mainly consist of a sequence number. While in the SO state the decompressor does a simple extrapolation based on information it knows about the pattern of change of the header field and the sequence number contained in the SO header in order to regenerate the uncompressed header. The compressor leaves this state to go back to the FO state if the header no longer conforms to the uniform pattern, or to the IR state if a counter so indicates in a unidirectional mode. Further details regarding the ROHC scheme can be gathered from the IETF specification RFC (Request For Comments) 3095 and from the 3GPP (Third Generation Partnership Project) specification TR (Technical Report) 25.844.

Currently, it is assumed that either the header compression is not taken into account when bearers are allocated, as for example in UTRAN Release 4 test specifications TS (Technical Specification) 34.108 and 34.123 parts 1-3, or the header compression is taken into account so that a lower bandwidth is allocated right from the beginning for a connection which uses header compression. In the former case, a problem arises due to the waste of resources, since the channel is reserved for full header and payload even though the actual bit rate of the compressed data is low. In the latter case, a problem arises in the beginning of the transmission when the header compression is started, as there is a need to send longer headers, i.e. full headers with some ROHC compression overhead to initialize the decompressor. If the channel is dimensioned for the narrow channels, some payload will be lost. Alternatively, a significant delay has to be allowed, which may not be possible due to real-time nature of RTP/UDP/IP traffic.

Another problem arises from the fact that the output of the compression cannot be predicted if it is allowed to use any header format. The headers can be encapsulated, they may have different options, either IPv6 or IPv4 may be used, the connection may be encrypted (ESP/IP), etc. Thus, the corresponding radio network controller device, e.g. the RNC of the UTRAN, should either know in advance the details of the headers of each specific connection, or the headers should be controlled by the network operator. The former case is not possible in the current specification releases. The latter case is possible in some specific cases, but its use will be very limited due to the fact that the network operators typically do not have control over the IP stack implementation in terminal devices, e.g. phones, laptops, PDAs etc., of the networks.

SUMMARY OF THE INVENTION

It is therefore an object of the present invention to provide a method and network or terminal device for allocating a radio resource to a data connection, by means of which the resource utilization can be optimized.

This object is achieved by a method of allocating of a radio resource to a data connection, which may be provided
  at an interface between a core network and a radio access network, or
  in a core network, or
  in a radio access network, or
  in a terminal,
said method comprising the steps of:
allocating a radio resource to said data connection;
compressing data transmitted via said data connection, in the direction from the radio access network to the terminal, or from the terminal to the radio access network, or in the both directions;
using said allocated radio resource for transmitting said compressed data;
monitoring a transmission parameter of said compressed data; and
reconfiguring said allocated radio resource based on the result of said monitoring step.

Furthermore, the above object is achieved by a network device for allocating a radio resource to a data connection, said network device comprising:
allocating means for allocating a radio resource to said data connection;
compressing means for compressing data transmitted via said data connection; and
monitoring means for monitoring a transmission parameter of said compressed data;
wherein said allocating means is arranged to reconfigure said allocated radio resource in response to the monitoring result of said monitoring means.

Furthermore, the aforementioned object is achieved by a terminal device for allocating a radio resource to a data connection, said terminal device comprising:
allocating means for allocating a radio resource to said data connection;
compressing means for compressing data transmitted via said data connection; and
monitoring means for monitoring a transmission parameter of said compressed data;
wherein said allocating means is arranged to reconfigure said allocated radio resource in response to the monitoring result of said monitoring means.

Accordingly, when radio resources are allocated for a data connection, e.g. an IP connection, the output of the IP traffic after compression is monitored or analyzed and the radio resource is defined based on the outcome of this monitoring or analyzation process. Thereby, header compression benefits are available to all kinds of traffic without the disadvantages of waste resources or lost packets. Moreover, the data rate allowed by the transmission resource can be adjusted to the real traffic without the disadvantages of having too low or too high data rates, even if the compression rate is not known in advance.

The transmission resource may be a radio bearer or any other resource to be allocated for providing a data connection between the radio access network and the terminal.

Furthermore, the monitored transmission parameter may be a bit rate of the compressed data, e.g. an average bit rate or a maximum bit rate.

Alternatively, the monitored transmission parameter may be a transmission time, wherein the allocated radio resource is reconfigured after the expiry of a predetermined time period.

As a further alternative, the monitored transmission parameter may be a compression state, wherein the allocated radio resource is reconfigured after a predetermined compression state has been reached. The predetermined compression state may be an FO or SO state of an ROHC compression.

The initial allocation step may be performed on a basis of a bit rate required for non-compressed data.

The compression may be a header compression scheme, e.g. an ROHC compression.

The reconfiguration step may be based on at least one of an information on states and/or modes of a header compressor, an information on states and/or modes of a header decompressor, a received data rate from a terminal device connected to the data connection, a compression feedback frame received from a decompressor of the terminal device, an input to the header compressor, and an output of the header decompressor.

The monitoring and reconfiguration steps may be performed continuously during transmission via the data connection.

Furthermore, the monitoring means of the network device may comprise a timer means for counting a time period after the start of compression by the compressing means, wherein the allocating means may be arranged to reconfigure the selective radio resource when a predetermined time period has been counted by the timer means.

The network device may be a radio network controller, e.g. an RNC of a UTRAN, or a base station device, e.g. a BSC (Base Station Controller) of a GERAN. Advantageous further developments are defined in the dependent claims.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENTS

Figure 1:
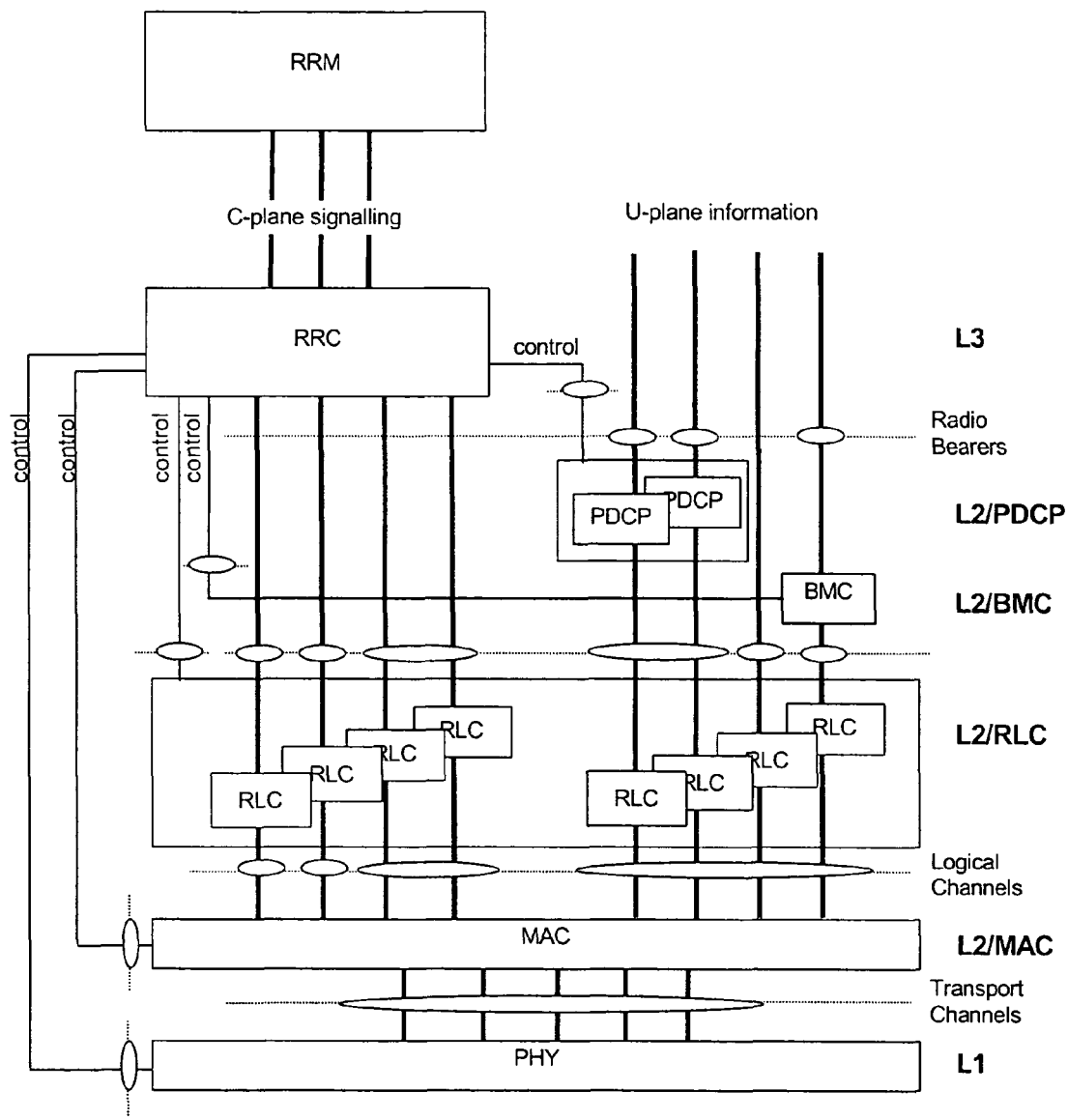
FIG. 1 shows an example of a radio interface protocol architecture in which the present invention can be implemented.

The preferred embodiment of the present invention will now be described on the basis of a radio interface protocol architecture of a UMTS system, as defined, e.g. in the 3GPP specification TS 25.301. FIG. 1 shows a schematic block diagram of such a radio interface protocol architecture.

According to FIG. 1, the radio interface is layered into three protocol layers, i.e. the physical layer L1, the data link layer L2 and the network layer L3. The data link layer L2 is split into several sublayers, i.e. a medium access control MAC, a radio link control RLC, a packet data convergence protocol PDCP and a broadcast/multicast control BMC. The network layer L3 and radio link control RLC are divided into control planes (C-planes) and user planes (U-planes). The packet data convergence protocol PDCP and the broadcast/multicast control BMC exist in the U-plane only.

In the C-plane, the network layer L3 is partitioned into sublayers where the lowest sublayer, denoted as radio resource control RRC, interfaces with the data link layer L2 and terminates in the UTRAN. In the upper direction, the radio resource control RRC is connected via a duplication avoidance functionality (not shown) to a Radio Resource Management functionality RRM of a non-access stratum (NAS) which comprises protocols between a UE and the CN, which are not terminated in the UTRAN.

In FIG. 1, service access points (SAP) for peer-to-peer communication are marked with circles at the interface between the sublayers. The SAP between the medium access control MAC and the physical layer L1 provides the transport channels. The SAPs between the radio link control RLC and the medium access control MAC sublayers provide logical channels. The RRC layer provides three types of SAPs, one for each RLC operation mode. The packet data convergence protocol PDCP and broadcast/multicast control BMC are accessed by respective SAPs. The service provided by the data link layer L2 is referred to as a radio bearer. The C-plane radio bearers, which are provided by the radio link control RLC to the radio resource control RRC are denoted as signaling radio bearers.

Also shown in FIG. 1 are connections between radio resource control RRC and medium access control MAC as well as between radio resource control RRC and the physical layer L1, providing local interlayer control services. An equivalent control interface exists between the radio resource control RRC and the radio link control RLC sublayer, between the radio resource control RRC and the packet data convergence protocol sublayer and between the radio resource control RRC and the broadcast/multicast control BMC sublayer. These interfaces allow the radio resource control RRC to control the configuration of the lower layers.

There are primarily two kinds of signaling messages transported over the radio interface, i.e. RRC generated signaling messages and NAS (non-access stratum) messages generated in the higher layers. The radio resource control RRC layer handles the control plane signaling of the network layer L3 between the UEs and the UTRAN. In particular, the radio resource control RRC can, on request from higher layers, perform the establishment, reconfiguration and release of radio bearers in the user plane. A number of radio bearers can be established to an UE at the same time. At establishment and reconfiguration, the RRC layer performs admission control and selects parameters describing the radio bearer processing in the data link layer L2 and the physical layer L1 based on information from higher layers.

The packet data conversion protocol PDCP performs header compression and decompression of IP data streams, e.g. TCP/IP and RTP/UDP/IP headers at the transmitting and receiving entity, respectively. The header compression method is specific to the particular network layer, transport layer or upper layer protocol combinations, e.g. TCP/IP and RTP/UDP/IP. Transmission of user data means that the packet data conversion protocol receives a PDCP service data unit (SDU) from the NAS and forwards it to the RLC layer and vice versa.

In application-based capacity allocation, in which for instance an application of a UE transmits a request to the network to establish a radio bearer, a capacity request is transmitted from the UE as control signaling to a session management (SM) function managing core network connections from which the capacity request is forwarded to the corresponding function of a serving node (e.g. a serving GPRS Support Node (SGSN). The serving node of the CN negotiates with the radio resource management function RRM on whether radio resources according to the capacity request are available. If there are enough resources, the serving node gives the resource allocation task to the resource management system RRM whose tasks include the allocation of the limited radio resources as optimally as possible to the different radio bearers. The radio resource management RRM determines what kind of radio resource parameters would be optimal for using the application and defines the most suitable parameters for the radio bearer according to the available radio resource capacity. Then, the radio resource management RRM transmits an instruction to the radio resource control RRC which performs the actual radio resource allocation.

Figure 2:
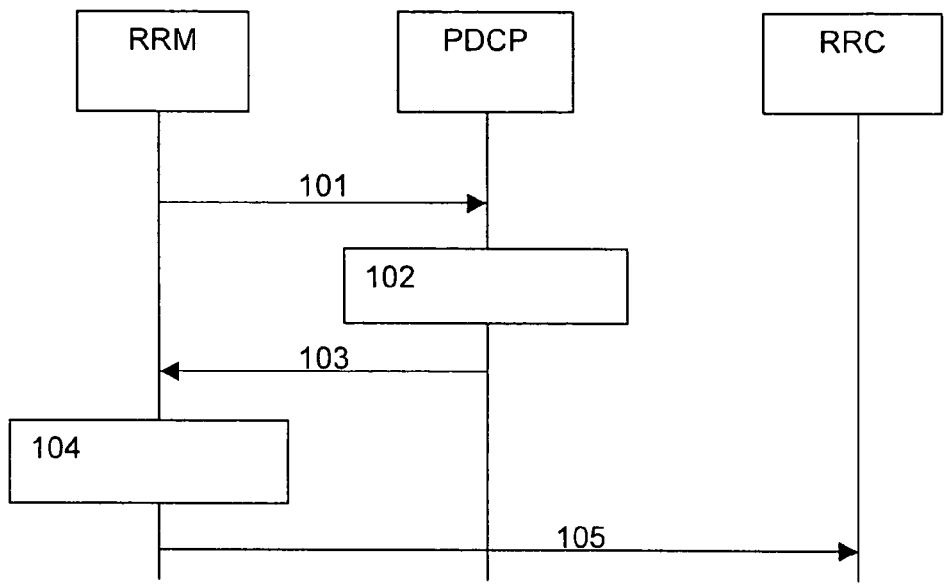
FIG. 2 shows a schematic signaling and processing diagram according to the preferred embodiment.

FIG. 2 shows a schematic signaling and processing diagram indicating a radio bearer allocation according to the preferred embodiment. When a connection needs a radio bearer, the radio resource management functionality RRM sets a reporting criterion, e.g. a predetermined maximum or average data rate, for reporting to the packet data conversion protocol layer PDCP (step 101). The PDCP layer measures the throughput while controlling the header compression (step 102). If the PDCP layer detects that the criterion is fulfilled, a corresponding report is generated and transmitted to the radio resource management functionality RRM (step 103). Then, the radio resource management functionality RRM decides to reconfigure the radio channel in question in order to match with the needed throughput (step 104). Then, the radio resource management functionality RRM transmits a channel reconfiguration request to the radio resource control functionality RRC (step 105).

The reconfiguration may be performed for the uplink (terminal to UTRAN) and for the downlink (UTRAN to terminal) connection independently. In case the reconfiguration is done for the uplink direction, the reconfiguration has to be signalled to the terminal using the appropriate RRC signalling.

The reporting criterion could as well be a coefficient of header compression utilization. Thereby, it is possible to balance the amount of radio channel reconfigurations with the header compression gain.

If there is RTCP traffic over the same bearer as RTP traffic, and the first RTCP (real-time transport control protocol) packets are sent some time after the first RTP packet, the reconfiguration may be delayed as follows.

The reconfiguration may be done after the compression for the RTCP packets is operating, i.e. FO or SO headers of RTCP packets are sent. Otherwise, the first RTCP packets with long (IR) headers would cause similar problems as the first RTP packets.

According to another alternative the reporting criterion may be a time count provided by timer which has been set to a predefined value, so that the first RTCP packets have been transmitted before the timer expires. The reconfiguration is then done after the timer has expired. RTP and RTCP traffics are compressed independently, even though they were on the same bearer.

Figure 3:
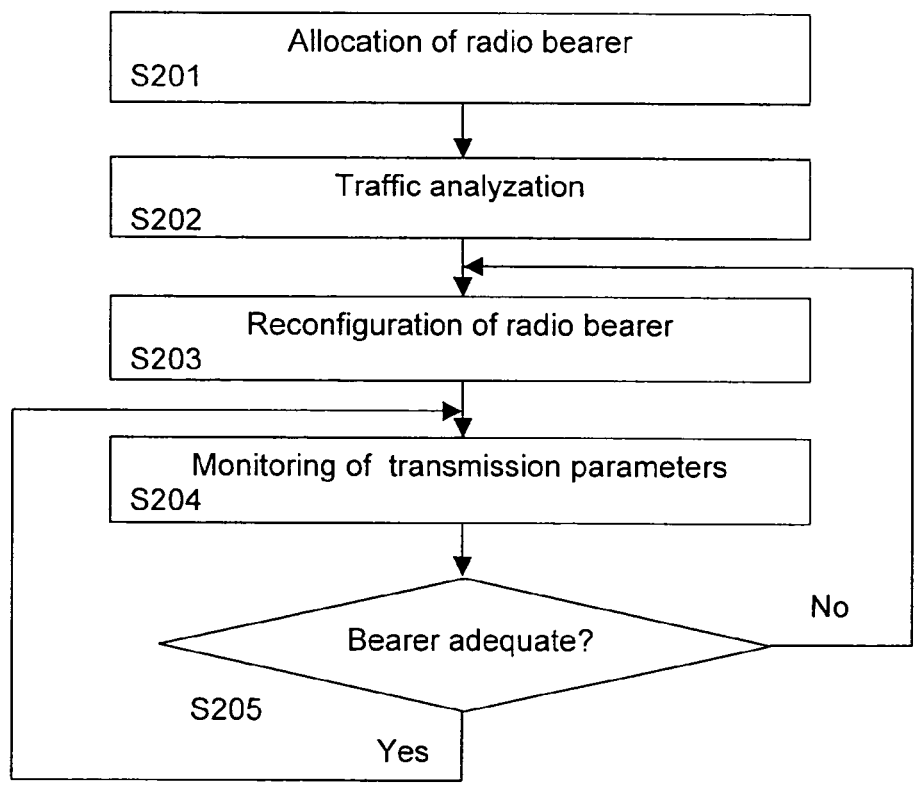
FIG. 3 shows a schematic flow diagram indicating a resource allocation method according to the preferred embodiment.

FIG. 3 shows a schematic flow diagram of a radio bearer allocation scheme according to the preferred embodiment. The steps described in FIG. 3 may be performed independently for the uplink and the downlink directions.

In the beginning of an IP call, when the concerned IP connection needs a radio bearer, a radio bearer is allocated so that its bit rate is sufficient for the non-header compressed headers plus the overhead needed for the compression scheme, e.g. ROHC compression, and the payload (step S201). For example, the bit rate may be selected to be sufficient for ROHC IR headers and payload. Then, in step S202 the bit stream is analyzed, and after the header compressor has changed to a higher state, e.g. shorter FO headers or shortest SO headers are sent, the final bit rate is determined. The radio bearer is reconfigured accordingly in step S203.

The procedures are similar for the uplink and the downlink. The information on the change of IR state to SO or FO state in the header compressor of the terminal, is not detected directly, but may be based, for example, on the ROHC headers received by the PDCP in the UTRAN.

In particular, the analyzation in step S202 may be based on an average bit rate or a maximum bit rate at the output of the header compressor, possible utilizing also one or more other parameters, e.g. an information on states and/or modes of the used header compressor, an information on states and/or modes of the used header decompressor, a data rate received from the connected terminal device, ROHC feed back frames received from the decompressor at the terminal device, an input to the header compressor, e.g. original non-compressed header, and/or an output from the header decompressor, e.g. de-compressed header.

As an alternative, a predetermined time period may be counted while the traffic is analyzed after that predetermined time period. In this case the time period may be set so that the ROHC compressor has reached the FO or SO state. In a simple example, the bit rate of the traffic may be analyzed in step S202 after a time period of e.g. some hundred milliseconds or after some seconds from the beginning of the IP call, and the new bearer bit rate is then allocated.

In a step S203, the new bit rate can be allocated so that it is somewhat higher than the rate required by SO headers in order to be capable to carry also FO headers with some delay.

Thereafter, in a step S204 the traffic is monitored with respect to its transmission parameters (e.g., bit rate), and in step S205 it is checked whether the allocated radio bearer is still adequate or whether a new bearer with a higher bit rate should be allocated. If it is determined that the bearer is adequate, the procedure returns to step S204 and continues monitoring the transmission parameters. If not, the procedure returns to a step S203 and the bearer is reconfigured again.

Thus, depending on the monitored parameter, a reconfiguration to a higher bit rate can be done, if e.g. the size of the compressed headers gets significantly larger, or an IR frame is detected at the output of the compressor. This may happen for example during a relocation of the serving radio network subsystem (SRNS) of the UTRAN, if ROHC context relocation is not used or if the decompressor context is lost for other reason. The reconfiguration back to lower data rate may happen when the compressor has reached FO or SO state.

It is noted that in the above example, an unacknowledged RLC mode with timer based discard is assumed allowing buffering of data whenever the data rate of the compressed headers and payload is temporarily higher than the maximum data rate of the radio bearer. However, the dynamic allocation scheme according to the preferred embodiment may as well be used in the acknowledged and transparent RLC mode.

Accordingly, when radio bearers are allocated to IP traffic or other kinds of traffic, the output of the traffic after header compression is analyzed and the bearer is defined based on the outcome of this analysis. Although compression of RTP/UDP/IP headers has been used in the preferred embodiment, the described resource allocation scheme is applicable to other headers as well, e.g. UDP/IP, TCP/IP, ESP/IP or IP. In general, the present invention can be used in connection with any compression method, e.g. compression schemes as defined in the IETF specifications RFC3095 or RFC2507 or any other known compression scheme. The present invention may be implemented in a radio network controller (RNC), a base station controller (BSC), user equipment or any other equipment in charge of controlling the use and integrity of the radio resources.

The present invention is not restricted to radio systems where the header compression is performed in radio access network, but is applicable, for example, in a Gb/A mode GERAN where the header compression is carried out in core network (in SGSN). Even though in the system described above the control of the radio resources is primarily in the network, the present invention is not restricted only to such systems. The present invention may be implemented also in systems, where the radio resources are controlled partly or totally by terminals, e.g., in ad hoc type of networks, such as WLAN (Wireless Local Area Networks) or Bluetooth type of networks, where the allocation of the radio resources may be partly done by the terminal.

Furthermore, the method is not limited to compression of headers only, but can be applied also to compression of payload (such as International Telecommunications Union specification ITU-T V.42 bis) or to compression of signalling. The method can be used also with a combination of header and payload compression so that the transmission rate may be lowered gradually, according to header and payload compressor state changes. The monitored transmission parameters may be similar to those described for header compression, e.g., they can be related to payload compressor or decompressor state, bit rate, or a combination of them.

The preferred embodiments may thus vary within the scope of the attached claims.

The invention claimed is:

1. A method, comprising:
allocating for at least one of uplink and downlink directions a radio resource to a data connection, wherein said allocating is performed independently for uplink and downlink directions;
monitoring a transmission parameter of compressed data, transmitted via the data connection using the radio resource, to detect a compressor state of a compressor of the compressed data; and
reconfiguring said allocated radio resource after a predetermined compressor state has been reached, wherein the predetermined compressor state is a higher compression state than the compression state used in initialization of header compression.

2. The method according to claim 1, wherein said radio resource is a radio bearer.

3. The method according to claim 1, wherein said monitored transmission parameter is a bit rate of said compressed data.

4. The method according to claim 1, wherein said monitored transmission parameter is the transmission time and wherein said allocated radio resource is reconfigured after the expiry of a predetermined time period.

5. The method according to claim 1, wherein said monitored transmission parameter is said compressor state.

6. The method according to claim 1, wherein said predetermined compression state is a first order state (FO) or a second order state (SO state) of a robust header compression (ROHC).

7. The method according to claim 1, wherein said data connection is a real time transmission protocol (RTP) or internet protocol (IP) connection.

8. The method according to claim 1, wherein said allocation is performed on the basis of a bit rate required for non-compressed data.

9. The method according to claim 1, wherein said compression is a compression of a header or a signaling or a payload or a combination of header and payload compression.

10. The method according to claim 1, wherein said reconfiguration is based on at least one of
an information on states and modes of a header compressor,
an information on states and modes of a header decompressor,
a received data rate from a terminal device connected to said data connection,
a compression feedback frame received from a decompressor of said terminal device,
an input to said header compressor, and
an output of said header decompressor.

11. The method according to claim 1, wherein said monitoring and reconfiguration are continuously performed during transmission via said data connection.

12. An apparatus, comprising:
at least one processor; and
at least one memory including computer program codes, which when executed by the at least one processor, cause the apparatus to perform the following functions:
allocating for at least one of uplink and downlink directions a radio resource to a data connection, wherein said allocating is performed independently for uplink and downlink directions;
monitoring a transmission parameter of compressed data, transmitted via the data connection using the radio resource, to detect a compressor state of a compressor of the compressed data; and
reconfiguring said allocated radio resource after a predetermined compressor state has been reached, wherein the predetermined compressor state is a higher compression state than the compression state used in initialization of header compression.

13. The apparatus according to claim 12, wherein said monitor comprises a timer configured to count a time period after the start of compression by said compressor wherein said allocator is configured to reconfigure said allocated radio resource when a predetermined time period has been counted by said timer.

14. The apparatus according to claim 12, wherein said monitor is configured to detect said predetermined compressor state of said compressed data.

15. The apparatus according to claim 12, wherein said network device is a radio network controller device or a base station controller device.

16. The apparatus according to claim 12, wherein said data connection is provided at an interface between a core network and a radio access network, in a core network or in a radio access network.

17. A non-transitory computer readable medium having embodied thereon a computer program the computer program being configured to control a processor to perform:
allocating for at least one of uplink and downlink directions a radio resource to a data connection, wherein said allocating is performed independently for uplink and downlink directions;
monitoring a transmission parameter of compressed data, transmitted via the data connection using the radio resource, to detect a compressor state of a compressor of the compressed data; and
reconfiguring said allocated radio resource after a predetermined compressor state has been reached, wherein the predetermined compressor state is a higher compression state than the compression state used in initialization of header compression.

* * * * *